United States Patent [19]

Kusumoto

[11] E Re. 31,401

[45] Reissued Oct. 4, 1983

[54] ELECTRONIC TIMEPIECE

[75] Inventor: Yasuo Kusumoto, Tokyo, Japan

[73] Assignee: Kabushiki Kaisha Daini Seikosha, Tokyo, Japan

[21] Appl. No.: 240,476

[22] Filed: Mar. 4, 1981

Related U.S. Patent Documents

Reissue of:

[64] Patent No.: 4,142,359
Issued: Mar. 6, 1979
Appl. No.: 752,440
Filed: Dec. 20, 1976

[30] Foreign Application Priority Data

Dec. 19, 1975 [JP] Japan ..... 50-151665

[51] Int. Cl.[3] ..... G04C 19/00

[52] U.S. Cl. ..... 368/69; 369/83; 369/155; 369/187; 369/223

[58] Field of Search ..... 368/29, 82–84, 368/156, 185, 187–189, 69, 70, 223, 239, 241, 242, 34, 155

[56] References Cited

U.S. PATENT DOCUMENTS

| | | | |
|---|---|---|---|
| 3,738,099 | 6/1973 | Tanaka . | |
| 3,866,406 | 2/1975 | Roberts | 368/34 |
| 3,943,696 | 3/1976 | Portmann et al. | 368/29 |
| 3,961,472 | 6/1976 | Riehl | 368/29 |
| 3,961,478 | 6/1976 | Riehl | 58/4 A |
| 3,979,899 | 9/1976 | Yoshida et al. | 368/250 |
| 4,033,108 | 7/1977 | Bennett et al. | 368/70 |
| 4,052,842 | 10/1977 | Beguin et al. | 368/250 |
| 4,058,971 | 11/1977 | Epperson | 368/29 |

OTHER PUBLICATIONS

LSI 010 LED Watch Circuit (Specification) 12/74.
Evans 1976, Bicentennial Catalog, Copyright 1975.

*Primary Examiner*—Bernard Roskoski
*Attorney, Agent, or Firm*—Robert E. Burns; Emmanuel J. Lobato; Bruce L. Adams

[57] ABSTRACT

An electronic timepiece having an A.M. and P.M. display function. The characters A or P are displayed during time setting or correction by one discretionary display element of a plurality of display elements normally used for displaying time.

7 Claims, 3 Drawing Figures

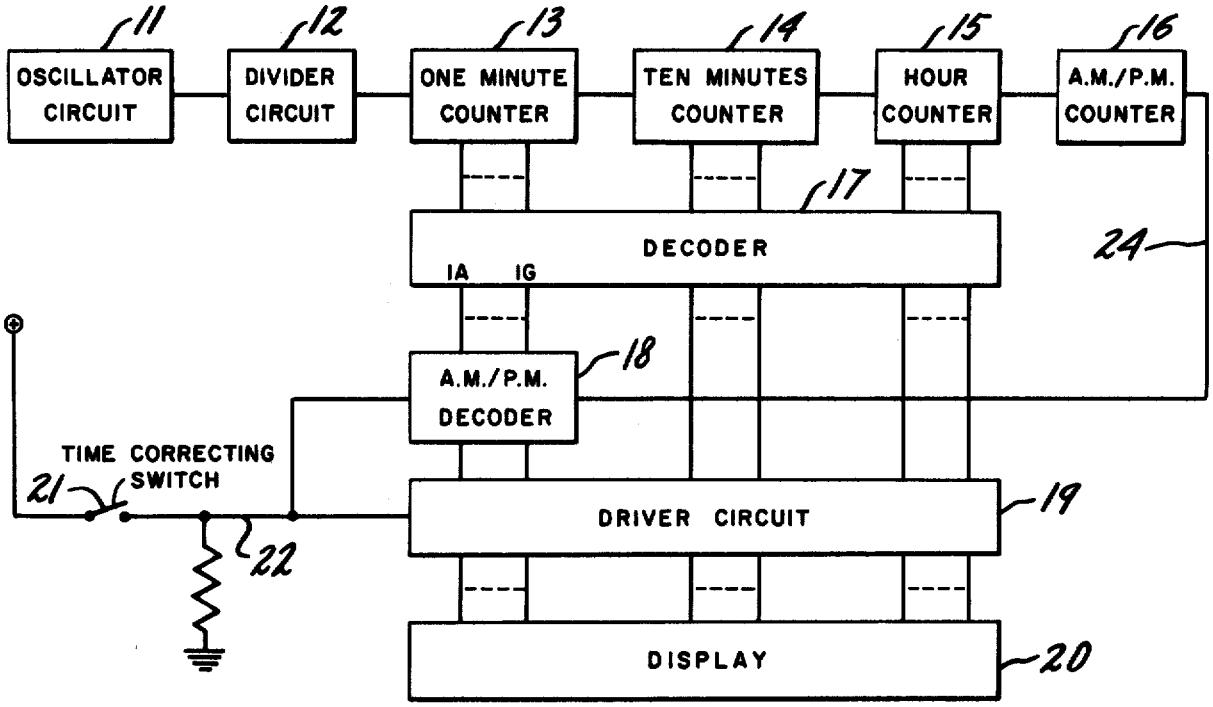
FIG. 1
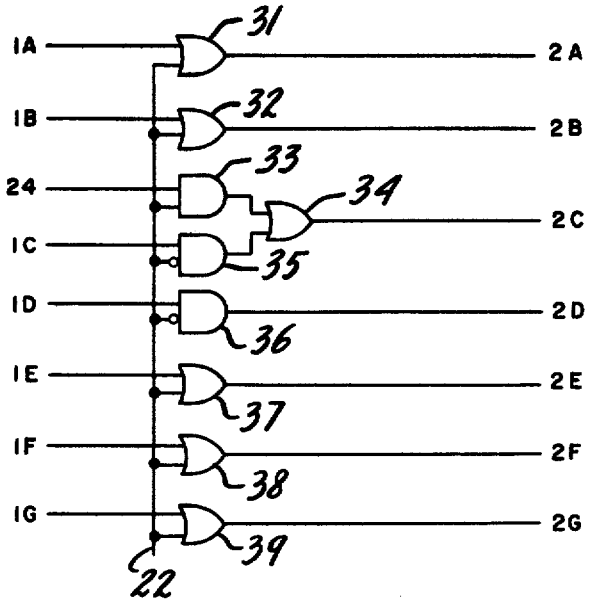
FIG. 2
FIG. 3
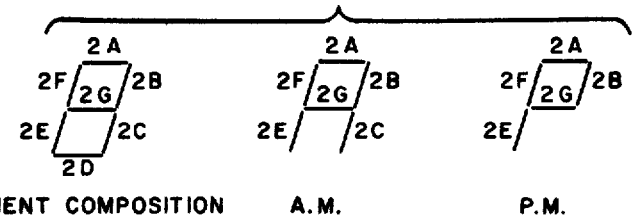

ELECTRONIC TIMEPIECE

Matter enclosed in heavy brackets [ ] appears in the original patent but forms no part of this reissue specification; matter printed in italics indicates the additions made by reissue.

BACKGROUND OF THE INVENTION

The present invention relates to an A.M. and P.M. display method in a digital timepiece of 12 hours cycle display time.

Conventionally, for a timepiece of this type, A.M. and P.M. dislays are distinguished by flashing of particular segments (e.g. a colon to distinguish hour and minute figures or a day display segment of the like) on a display panel or, a letter simply designating A.M. or P.M. is provided to constantly display A.M. or P.M.

In the former case, however, since A.M. or P.M. are distinguished by flashing of particular segments, it is impossible for a user to read out A.M. or P.M. unless he gets used to the timepiece. While in the latter case it is disadvantageous with respect to manufacturing cost and reliability since two surplus output terminals from a timepiece circuit IC is necessary, and moreover, it is difficult to provide a letter indicating A.M. and P.M. in a small display panel such as that used in a wrist watch.

BRIEF SUMMARY OF THE INVENTION

It is an object of the invention to provide A.M. and P.M. indication without providing a new display segment. A.M. and P.M. are displayed utilizing seven segments of a minute figure (1 minute or 10 minutes figure) only when the time display is corrected (hereinafter the operation is designated as time correction), wherein A.M. is designated as "A" and P.M. is designated as "P".

The reason why A.M. and P.M. are displayed only in case of time correction is that normally, a user is seldom required to read out A.M. and P.M. from the timepiece except in case of time correction, and so it is [almost meaningless or useless] *not normally necessary* to display A.M. and P.M. constantly.

BRIEF DESCRIPTION OF THE DRAWINGS

FIG. 1 is a circuit block diagram showing the structure of an electronic timepiece according to the present invention, FIG. 2 is a decoder circuit diagram of the AM/PM decoder circuit shown in FIG. 1, FIG. 3 is a diagram showing A.M. and P.M. display configuration.

DETAILED DESCRIPTION OF THE INVENTION

Referring to the attached drawings, in FIG. 1, there is shown a block diagram of the preferred embodiment of the present invention. In this embodiment, "A" or "P" is displayed on 1 minute figure position of a timepiece display.

The block diagram in FIG. 1 is the same as that of the usual digital timepiece except for an A/P decoder 18. A detailed circuit diagram of the A/P decoder is shown in FIG. 2.

In FIG. 1, one group of minute figure outputs 1A–1G of the decoder 17 output are connected with the A/P decoder 18. Then, if the correction switch 21 is usually in the open condition, a line 22 is at logic level "0". And in FIG. 2, signals from 1A–1G are fed to a driver circuit 19 through AND or OR logic gates 31–39 and display a figure according to the content of the one miniute counter 13. [However, as for the] *The* output [24] from the A/P [flop flop] *flip flop* or counter 16[, as] *comprises an AM/PM signal representative of whether the time is A.M. or P.M. and the signal is fed along a line 24 to* an AND gate [35 closes, only] *33 which, when closed, enables the* one minute counter output 2C [is] *to be* displayed.

In case of time correction, on the other hand, as the time correction switch 21 responsive to an external command is ON and the line 22 becomes logic level "1", the logic gates [31–34 and 36–39] *31–32 and 34–39* in FIG. 2 close and only the gate [35] *33* opens, and so the A/P [flop flop] *flip flop* output is displayed on the output 2C. While the other outputs 2A, 2B, 2E, 2F and 2G become logic "1" and the output 2D becomes logic "0". FIG. 3 shows the relation between each of the segments of *the seven segment array which comprises the* one minute figure digit and the A/P decoder output.

When time is corrected, the segment 2D becomes "0" (i.e. [darkened] *non-illuminated*) and the segments 2A, 2B, 2E, 2F and 2G become "1" (i.e. illuminated). Then, if the *AM/PM output signal of the* A/P flip flop [output] is selected so that the segment 2C becomes logic "1" in A.M., the digit displays "A", while when the segment 2C becomes logic "0" in P.M., the digit displays "P" and either A.M. and P.M. is immediately read out.

As illustrated so far, according to the present invention, an effective A.M. and P.M. display method can be obtained simply without providing a surplus display element or figure or an electric output terminal.

In the present embodiment, though A.M. and P.M. is displayed by the 1 minute or 10 minutes figure segments, the other display segments (e.g. seven segments for a day or a month display) can be utilized in the same way.

What is claimed is:

1. An electronic timepiece, comprising: an oscillator circuit for generating a repetitive time standard signal; a divider circuit receptive of the repetitive time standard signal for dividing the same and for developing a repetitive output signal having a repetition rate defining a unit of time; a time counter circuit connected to receive the dividing circuit output signal for counting the same and for developing a count representative of time; an AM/PM counter circuit connected to said time counter circuit and responsive to the count developed therein for developing a count indicative of whether the time is AM or PM; display means having a plurality of digit display positions for displaying time; decoder means connected to said time counter circuit for developing decoded output signal groups each for enabling a respective digit display position of said display means to enable said display means to display the time represented by the count developed by said time counter circuit; AM/PM decoder means receptive of one decoded output signal group from said decoder means and receptive of a control signal and connected to receive the count developed by said AM/PM counter circuit for developing the applied decoded output signal group as an output signal and *responsive to the control signal* for developing an output signal effective to display a character representative of AM and for developing an output signal effective to display a character representative of PM according to whether or not the control signal is applied to said AM/PM decoder means and according to whether or not the count developed by said AM/PM counter *circuit* represents AM or PM; *a driving circuit receptive of the decoder means output signal groups for driving said display means to display time and receptive of the output signals developed by said AM/PM decoder means for driving said display means to display characters representative of AM and PM;* and means for *selectively* developing said control signal.

[2. An electronic timepiece according to claim 1, further comprising: a driving circuit receptive of said decoder means output signal groups and the output signals developed by said AM/PM decoder means for driving said display means.]

3. An electronic timepiece according to claim 1[:], wherein the digit display positions of said display means are seven segment arrays.

4. An electronic timepiece according to claim 3[:], wherein said AM/PM decoder means is effective to display the character A to indicate AM and the character P to indicate PM.

5. An electronic timepiece according to claim 4, wherein said AM/PM decoder means is comprised of: five two-input OR gates each having a first input connected to receive one of the output signals of the applied decoded output signal group corresponding to segments of the digit display position which will be illuminated if either A or P is displayed, and each having a second input connected to receive the control signal for enabling the corresponding segments in response thereto; a two-input AND gate circuit having a first inverting input connected to receive the control signal and a second non-inverting input connected to receive the one of the output signals of the applied decoded output signal group corresponding to the one of the segments of the digit display position which will not be illuminated when either A or P is displayed; a pair of two-input AND gate circuits including a first of the pair having one input connected to receive the control signal and another input connected to receive [the one of the output signals of the applied decoded output signal group corresponding to the segment of the digit display position which will be illuminated when A is displayed but which will not be illuminated when P is displayed,] *a signal from said AM/PM counter circuit representative of AM and PM,* and the second of the pair having a first inverting input connected to receive the control signal and a second non-inverting input connected to receive [a signal from said AM/PM counter representative of AM and PM;] *the one of the output signals of the applied decoded output signal group corresponding to the segment of the digit display position which will be illuminated when A is displayed but which will not be illuminated when P is displayed;* and another two-input OR gate circuit having two inputs each connected to an output of a respective one of said pair of AND gate circuits.

6. An electronic timepiece according to claim 1, further comprising: a switch operable during time setting for applying the control signal to said AM/PM decoder means.

*7. An electronic timepiece, comprising: an oscillator circuit for generating a repetitive time standard signal; a divider circuit receptive of the repetitive time standard signal for dividing the same and for developing a repetitive output signal having a repetition rate defining a unit time; a time counter circuit connected to receive the dividing circuit output signal for counting the same and for developing a count representative of time; means connected to said time counter circuit and responsive to the count developed therein for developing an AM/PM signal representative of whether the time is AM or PM; display means having a plurality of digit display positions for displaying time; decoder means connected to said time counter circuit for developing decoded output signal groups each corresponding to a respective digit display position of said display means in order to enable said display means to display the time represented by the count developed by said time counter circuit; AM/PM decoder means receptive of one decoded output signal group from said decoder means and receptive of a control signal and connected to receive the AM/PM signal for developing the applied decoded output signal group as an output signal and for developing an output signal effective to display at a predetermined one of said digit display positions a character representative of AM and for developing an output signal effective to display at said predetermined one of said digit display positions a character representative of PM according to whether or not the control signal is applied to said AM/PM decoder means and according to whether or not the AM/PM signal represents AM or PM; a driving circuit receptive of the decoder means output signal groups for driving said display means to display time and receptive of the output signals developed by said AM/PM decoder means for driving said display means to display characters representative of AM and PM; and means for selectively developing said control signal.*

*8. An electronic timepiece according to claim 6, wherein at least said predetermined one of said digit display positions comprises a seven segment array; and said AM/PM decoder means comprises seven input terminals receptive of one decoded output signal group, an input terminal receptive of the AM/PM signal, a control terminal receptive of the control signal, and seven output terminals corresponding to the seven input terminals and corresponding to the seven segments of the seven segment array so that in the absence of the control signal, the signals applied to the seven input terminals appear on the corresponding seven output terminals to enable the corresponding seven segments whereby the seven segment array displays time and in response to the control signal, signals appear on five of the seven output terminals to enable the corresponding five segments of the seven segment array independent of the signals applied to the corresponding five input terminals, a signal appears on a sixth one of the seven output terminals to disable the corresponding one segment of the seven segment array, and a signal appears at the remaining one output terminal to enable or disable the corresponding one segment of the seven segment array according to the AM/PM signal whereby the seven segment array displays whether the time is AM or PM.*

* * * * *